(12) United States Patent
Cho et al.

(10) Patent No.: US 12,533,958 B2
(45) Date of Patent: Jan. 27, 2026

(54) SYSTEM FOR DIAGNOSTIC OF A BATTERY PACK, AND METHOD THEREOF

(71) Applicants: Hyundai Motor Company, Seoul (KR); Kia Corporation, Seoul (KR)

(72) Inventors: Hyun Ki Cho, Anyang-Si (KR); Jin Soo Jang, Yongin-Si (KR); Yoon Cheol Jeon, Suwon-Si (KR); Jong Pil Kim, Suwon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 139 days.

(21) Appl. No.: 18/386,059

(22) Filed: Nov. 1, 2023

(65) Prior Publication Data
US 2024/0343118 A1  Oct. 17, 2024

(30) Foreign Application Priority Data
Apr. 17, 2023 (KR) .................. 10-2023-0050163

(51) Int. Cl.
*B60L 3/00* (2019.01)
*B60L 58/18* (2019.01)
(Continued)

(52) U.S. Cl.
CPC ............ *B60L 3/0046* (2013.01); *B60L 58/18* (2019.02); *G01R 31/1263* (2013.01); *G01R 31/14* (2013.01)

(58) Field of Classification Search
CPC ......... B60L 3/0046; B60L 58/18; B60L 3/00; G01R 31/1263; G01R 31/14;
(Continued)

(56) References Cited

U.S. PATENT DOCUMENTS

| 2013/0214788 A1 | 8/2013 | Klijn |
| 2020/0144812 A1 | 5/2020 | Shin |

(Continued)

FOREIGN PATENT DOCUMENTS

| CN | 108398645 A | 8/2018 |
| JP | 2013-083611 A | 5/2013 |

(Continued)

OTHER PUBLICATIONS

May 13, 2024—(EP) European Search Report—App 23211733.3.

*Primary Examiner* — Shardul D Patel
(74) *Attorney, Agent, or Firm* — Banner & Witcoff, Ltd.

(57) ABSTRACT

A system for a vehicle may include a first battery pack diagnosis apparatus connected to a first battery pack, a second battery pack diagnosis apparatus connected to a second battery pack, a third battery pack diagnosis apparatus connected to a third battery pack, and a fourth battery pack diagnosis apparatus connected to a fourth battery pack. The first battery pack diagnosis apparatus may be configured to determine, based on a measured value of an integrated insulation resistance of an inverter terminal associated with the vehicle, whether a battery, of the first battery pack, the second battery pack, the third battery pack, or the fourth battery pack, is in a failure state, and based on a determination that the battery is in the failure state and based on individually measured insulation resistance of the first-fourth battery packs, determine a failure position of the battery.

20 Claims, 9 Drawing Sheets

(51) Int. Cl.
*G01R 31/12* (2020.01)
*G01R 31/14* (2006.01)

(58) Field of Classification Search
CPC .... G01R 27/025; G01R 31/396; G01R 31/52; G01R 31/008; G01R 31/392; G01R 1/206; G01R 31/3646; G01R 31/389; Y02E 60/10; H01M 10/48
USPC .................................................. 701/34, 34.4
See application file for complete search history.

(56) References Cited

U.S. PATENT DOCUMENTS

| | | | |
|---|---|---|---|
| 2020/0274371 A1* | 8/2020 | Kirleis | B64D 27/24 |
| 2021/0041507 A1* | 2/2021 | Eliassen | G01R 31/392 |
| 2022/0146561 A1 | 5/2022 | Ock et al. | |
| 2022/0392278 A1* | 12/2022 | Choi | G01R 31/396 |
| 2024/0210492 A1* | 6/2024 | Busby | H01M 50/204 |

FOREIGN PATENT DOCUMENTS

| | | |
|---|---|---|
| JP | 2019-204787 A | 11/2019 |
| KR | 101416816 B1 | 8/2014 |
| KR | 10-2019-0088153 A | 7/2019 |
| KR | 10-2020-0086887 A | 7/2020 |
| WO | 2022-271353 A1 | 12/2022 |

\* cited by examiner

SYSTEM FOR DIAGNOSTIC OF A BATTERY PACK, AND METHOD THEREOF

CROSS-REFERENCE TO RELATED APPLICATION

This application claims priority to and the benefit of Korean Patent Application No. 10-2023-0050163, filed in the Korean Intellectual Property Office on Apr. 17, 2023, the entire contents of which are incorporated herein by reference.

TECHNICAL FIELD

The present disclosure relates to a battery pack diagnosis system and a method thereof, and more particularly, to a technique for accurately determining whether parallel battery packs of a flight means are failed and a failed and a failure position.

BACKGROUND

A flight means may include an aircraft that has occupants, including pilots and passengers, on board and may fly (drive) autonomously or semi-autonomously, and a flying object that may fly autonomously by external control or program without occupants on board. Accordingly, such an autonomous flying object may be used in various fields such as visiting and investigating areas where it is difficult for humans to fly directly to perform missions, meteorological observation, planetary exploration, aerial photography, etc.

The flying object may mainly use a battery pack parallel system to maintain a reduced (e.g., minimum) output for safe flight even if some batteries fail.

In a hybrid vehicle using a high-voltage battery, insulation resistance measurement may be important for fault diagnosis of a battery pack. Accordingly, insulation resistance between the high-voltage battery and LV chassis ground may be periodically measured during flight operation or standby to diagnose battery failure.

However, as illustrated in FIG. 1, in a structure, relays 21 and 22 are connected to a rear end of a terminal to which an insulation resistance measuring device 10 and a battery pack are connected, and negative poles of a parallel battery pack may be connected through a pyro switch, and thus accurate measurement of insulation resistance may not be possible due to impedance interference between circuits that measure battery pack insulation resistance.

SUMMARY

According to the present disclosure, a system for a vehicle, the system may comprise: a first battery pack diagnosis apparatus connected to a first battery pack; a second battery pack diagnosis apparatus connected to a second battery pack; a third battery pack diagnosis apparatus connected to a third battery pack; and a fourth battery pack diagnosis apparatus connected to a fourth battery pack, wherein the first battery pack diagnosis apparatus may be configured to: determine, based on a measured value of an integrated insulation resistance of an inverter terminal associated with the vehicle, whether a battery, of the first battery pack, the second battery pack, the third battery pack, or the fourth battery pack, is in a failure state; and based on a determination that the battery is in the failure state and based on individually measured insulation resistance of the first battery pack, the second battery pack, the third battery pack, and the fourth battery pack, determine a failure position of the battery.

The system, wherein each of the first, second, third, and fourth battery pack diagnosis apparatuses may be configured to include: a relay circuit configured to control a voltage, of the first battery pack, to be applied to the inverter terminal; and a diagnosis circuit connected to an output terminal of the relay circuit to measure the integrated insulation resistance of the inverter terminal.

The system, wherein the diagnosis circuit may be configured to include: a resistance portion configured to include a plurality of resistors connected in parallel between the inverter terminal and a chassis ground terminal; a switch portion provided between the inverter terminal and the resistance portion; and a battery pack diagnosis controller configured to measure the integrated insulation resistance by controlling an on or off state of the switch portion.

The system, wherein the battery pack diagnosis controller may be configured to determine whether a relay of the first battery pack diagnosis apparatus, a relay of the second battery pack diagnosis apparatus, a relay of the third battery pack diagnosis apparatus, and a relay of the fourth battery pack diagnosis apparatus are closed.

The system, wherein the battery pack diagnosis controller may be configured to measure the integrated insulation resistance based on a determination that the relays of the first battery pack diagnosis apparatus, the second battery pack diagnosis apparatus, the third battery pack diagnosis apparatus, and the fourth battery pack diagnosis apparatus are closed.

The system, wherein the battery pack diagnosis controller may be configured to determine the integrated insulation resistance based on: a first pair of resistors, connected in series, connected to one of the relays; and a second pair of resistors, connected in series, connected to another of the relays. The system, wherein the battery pack diagnosis controller may be configured to determine whether the measured value of the integrated insulation resistance satisfies a predetermined insulation resistance diagnosis threshold.

The system, wherein the battery pack diagnosis controller may be configured to determine that each state of the first battery pack, the second battery pack, the third battery pack, and the fourth battery pack is a normal state based on a determination that the measured value of the integrated insulation resistance satisfies the predetermined insulation resistance diagnosis threshold.

The system, wherein the battery pack diagnosis controller may be configured to determine that at least one of the first battery pack, the second battery pack, the third battery pack, or the fourth battery pack is in a failure state based on a determination that the measured value of the integrated insulation resistance does not satisfy the predetermined insulation resistance diagnosis threshold.

The system, wherein the battery pack diagnosis controller may be configured to, based on a determination that the at least one of the first battery pack, the second battery pack, the third battery pack, or the fourth battery pack is in the failure state: output a battery failure state alarm; and sequentially measure insulation resistance of the first battery pack, the second battery pack, the third battery pack, and the fourth battery pack.

The system, wherein the battery pack diagnosis controller may be configured to, based on a determination that the at least one of the first battery pack, the second battery pack, the third battery pack, or the fourth battery pack is in the failure state: control relays of the first battery pack diagnosis apparatus, the second battery pack diagnosis apparatus, the third battery pack diagnosis apparatus, and the fourth battery pack diagnosis apparatus; individually control connection of the first battery pack, the second battery pack, the third battery pack, and the fourth battery pack to the inverter terminal; and measure insulation resistance of each of the first battery pack, the second battery pack, the third battery pack, and the fourth battery pack.

The system, wherein the battery pack diagnosis controller is configured, based on a determination that at least one of the relays of the first battery pack diagnosis apparatus, the second battery pack diagnosis apparatus, the third battery pack diagnosis apparatus, or the fourth battery pack diagnosis apparatus is open, or a determination that the battery is in the failure state based on the measured value of the integrated insulation resistance, to determine whether: a key off signal is received; and the relays of the first battery pack diagnosis apparatus, the second battery pack diagnosis apparatus, the third battery pack diagnosis apparatus, and the fourth battery pack diagnosis apparatus are open.

The system, wherein the battery pack diagnosis controller may be configured to, based on a determination that the key off signal is received and the relays of the first battery pack diagnosis apparatus, the second battery pack diagnosis apparatus, the third battery pack diagnosis apparatus, and the fourth battery pack diagnosis apparatus are open: after closing the relay of the first battery pack diagnosis apparatus, measure the integrated insulation resistance of the inverter terminal.

The system, wherein the battery pack diagnosis controller may be configured to: determine whether the measured value of the integrated insulation resistance fails to satisfy a predetermined insulation resistance diagnosis threshold after the relay of the first battery pack diagnosis apparatus is closed; determine that the first battery pack is in the failure state based on a determination that the measured value of the integrated insulation resistance fails to satisfy the predetermined insulation resistance diagnosis threshold after the relay of the first battery pack diagnosis apparatus is closed; and request start termination of operation of the vehicle.

The system, wherein the battery pack diagnosis controller may be configured to: determine that the first battery pack is in a normal state based on a determination that the measured value of the integrated insulation resistance satisfies the predetermined insulation resistance diagnosis threshold after the relay of the first battery pack diagnosis apparatus is closed; and after the relay of the first battery pack diagnosis apparatus is opened and the relay of the second battery pack diagnosis apparatus is closed, determine whether the second battery pack is in the failure state based on the measured value of the integrated insulation resistance.

The system, wherein the resistance portion may be configured to include: a first resistor and a second resistor connected in series between a positive voltage terminal of the inverter terminal and a chassis ground terminal; a third resistor and a fourth resistor connected in series between a negative voltage terminal of the inverter terminal and the chassis ground terminal; a first side of the switch portion connected to the negative voltage terminal of the inverter terminal; and a second side of the switch portion connected to a node between the first resistor and the second resistor.

The system, wherein the relay circuit may be configured to include: a first relay portion connected to a plus terminal of the first battery pack; and a second relay portion connected to a minus terminal of the first battery pack.

The system, wherein at least one of a diagnosis circuit of the first battery pack diagnosis apparatus, a diagnosis circuit of the second battery pack diagnosis apparatus, a diagnosis circuit of the third battery pack diagnosis apparatus, or a diagnosis circuit of the fourth battery pack diagnosis apparatus is connected to the inverter terminal to measure the integrated insulation resistance.

According to the present disclosure, a method for a vehicle may comprise: determining, by a first battery pack diagnosis apparatus and based on a measured value of an integrated insulation resistance of an inverter terminal associated with the vehicle, whether a battery, of a first battery pack, a second battery pack, a third battery pack, or a fourth battery pack, is in a failure state; and based on determining that a failure occurs in the battery and based on individually measuring insulation resistance of the first battery pack, the second battery pack, the third battery pack, and the fourth battery pack, determining a failure position of the battery, wherein: the first battery pack diagnosis apparatus is connected to the first battery pack; a second battery pack diagnosis apparatus is connected to the second battery pack; a third battery pack diagnosis apparatus is connected to the third battery pack; and a fourth battery pack diagnosis apparatus is connected to the fourth battery pack.

The method, wherein the determining of the failure position may comprise, after determining whether a key off signal is received and relays of the first battery pack diagnosis apparatus, the second battery pack diagnosis apparatus, the third battery pack diagnosis apparatus, and the fourth battery pack diagnosis apparatus are open, individually measuring insulation resistance of the first battery pack, the second battery pack, the third battery pack, and the fourth battery pack based on: a determination that at least one of the relays of the first battery pack diagnosis apparatus, the second battery pack diagnosis apparatus, the third battery pack diagnosis apparatus, or the fourth battery pack diagnosis apparatus is open; or a determination that the battery is in the failure state based on the measured value of the integrated insulation resistance measured in a closed state of the relays of the first battery pack diagnosis apparatus, the second battery pack diagnosis apparatus, the third battery pack diagnosis apparatus, and the fourth battery pack diagnosis apparatus.

DETAILED DESCRIPTION

Figure 1:
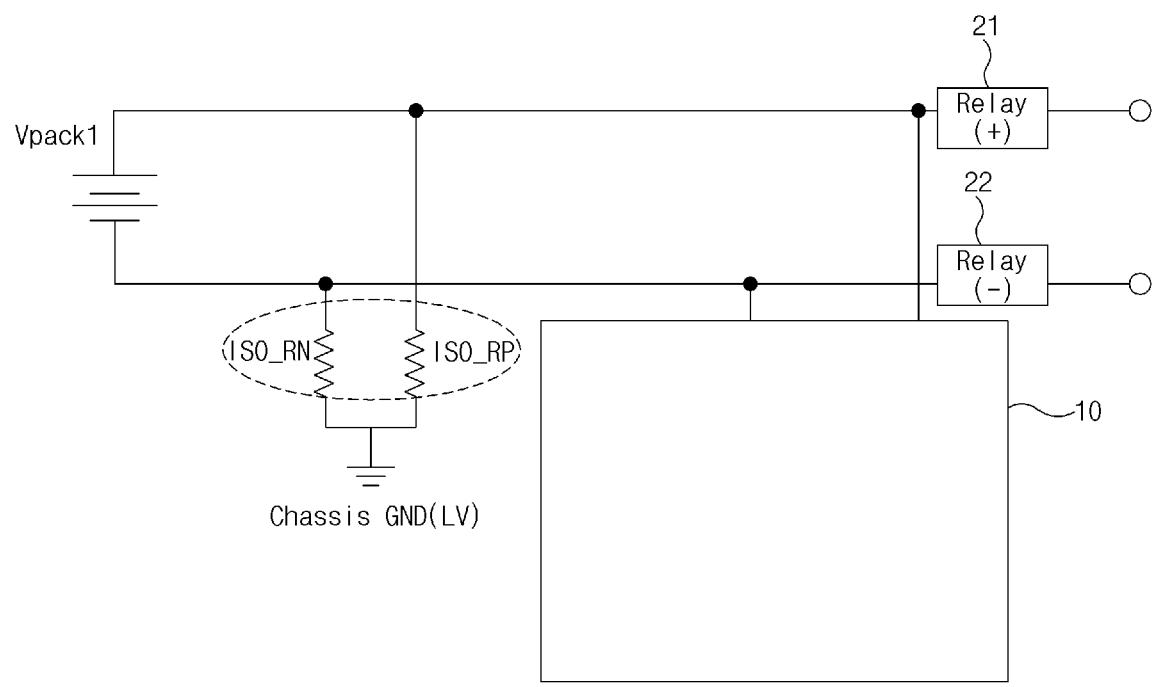
FIG. 1 shows an example battery pack diagnosis apparatus.

Hereinafter, some examples of the present disclosure will be described in detail with reference to drawings. It should be noted that in adding reference numerals to constituent elements of each drawing, the same constituent elements have the same reference numerals as possible even though they are indicated on different drawings. In describing an example, if it is determined that a detailed description of the well-known configuration or function associated with the example may obscure the gist of the present disclosure, it will be omitted.

In describing constituent elements according to an example, terms such as first, second, A, B, (a), and (b) may be used. These terms are only for distinguishing the constituent elements from other constituent elements, and the nature, sequences, or orders of the constituent elements are not limited by the terms. Furthermore, all terms used herein including technical scientific terms have the same meanings as those which are generally understood by those skilled in the technical field to which an example of the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, various examples of the present disclosure will be described in detail with reference to FIG. 2 to FIG. 8.

Figure 2:
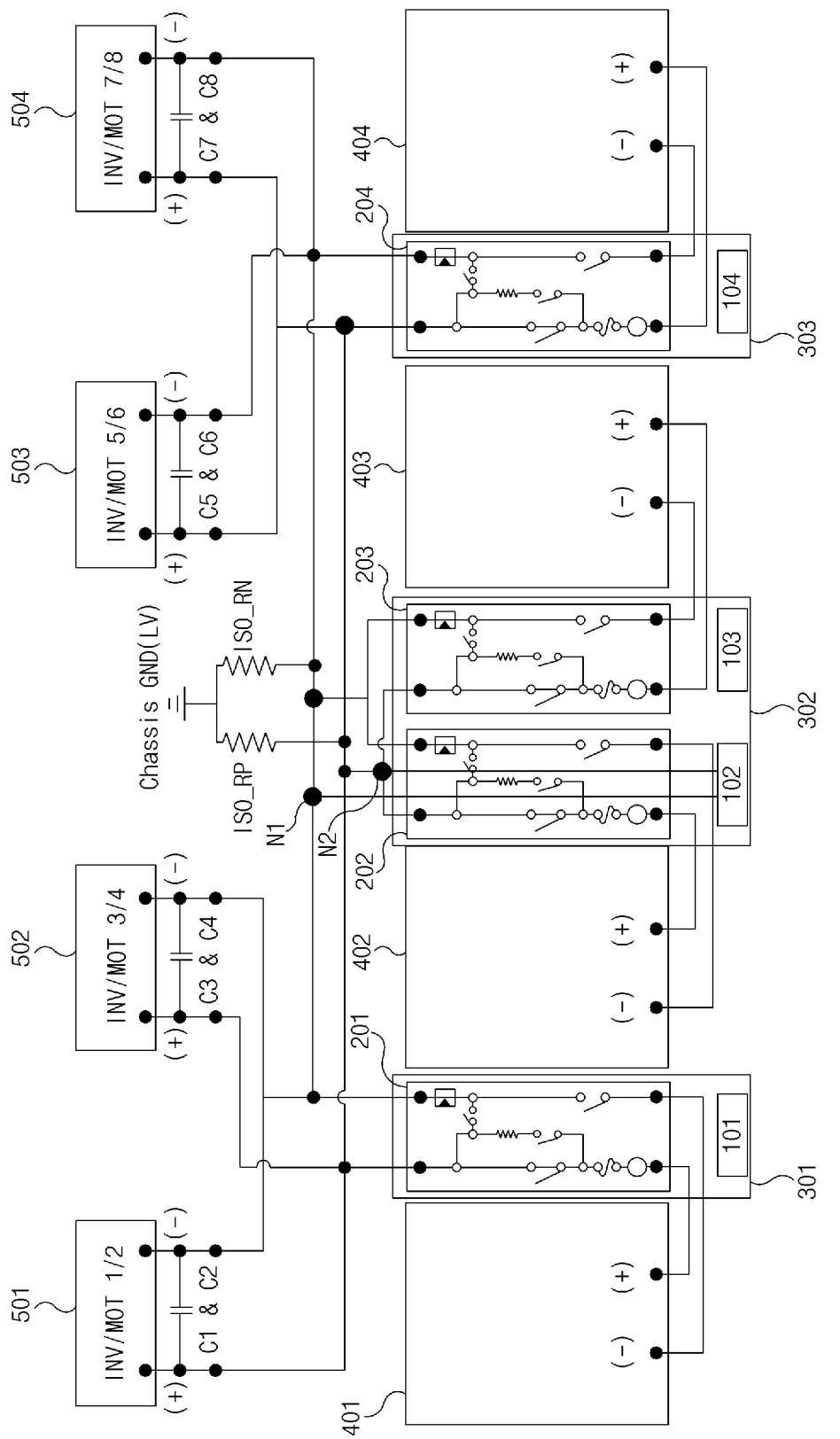
FIG. 2 shows an example battery pack diagnosis system.
Figure 3:
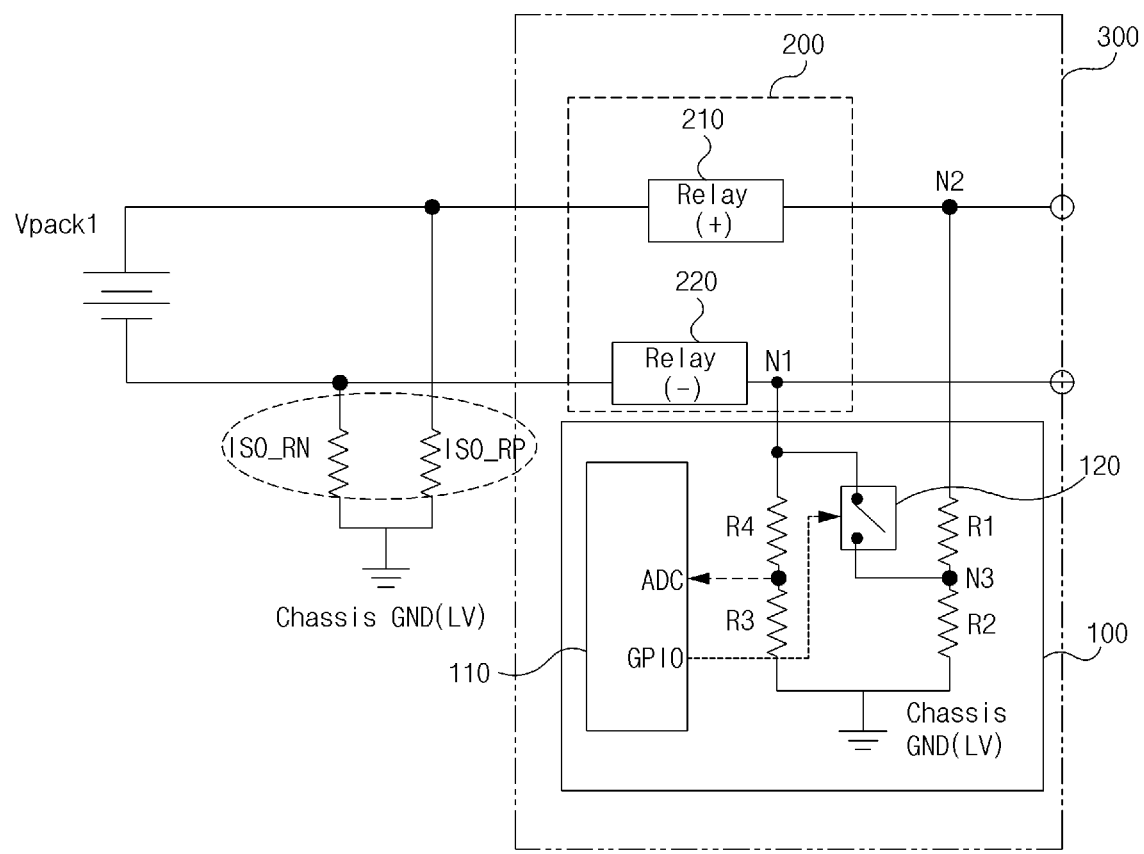
FIG. 3 shows an example battery pack diagnosis apparatus.

FIG. 2 shows an example battery pack diagnosis system, and FIG. 3 illustrates a detailed schematic diagram of an example battery pack diagnosis apparatus.

The battery pack diagnosis system of FIG. 2 may be mounted in a flight means. In addition or alternative, the flight means may include a first kind of air mobility vehicle that has occupants, including pilots and passengers, on board and may fly autonomously or semi-autonomously, and a second kind of air mobility vehicle that may fly autonomously by external control or program without occupants on board. Specifically, the flight means may include a helicopter, a drone, an airplane, or a vehicle that moves with wheels on the ground and may fly after it goes up in the air, and as mentioned earlier, these may include both manned and unmanned cases.

The battery pack diagnosis system according to an example of the present disclosure may be implemented inside or outside the flight means. In this case, the battery pack diagnosis system may be integrally formed with internal control units of the flight means, or may be implemented as a separate hardware device to be connected to control units of the flight means by a connection means. For example, the battery pack diagnosis system may be implemented integrally with the flight means, may be implemented in a form that is installed or attached to the flight means as a configuration separate from the flight means, or a part thereof may be implemented integrally with the vehicle, and another part may be implemented in a form that is installed or attached to the flight means as a configuration separate from the flight means.

In the flight means, a first motor, a first inverter, a fifth inverter, and a fifth motor may be connected in series, a second motor, a second inverter, a sixth inverter, and a sixth motor may be connected in series, a third motor, a third inverter, a seventh inverter, and a seventh motor may be connected in series, and a fourth motor, a fourth inverter, an eighth inverter, and an eighth motor may be connected in series. In FIG. 2, briefly, the first and second motors and the first and second inverters are illustrated as one block 501, the third and fourth inverters and the third and fourth motors are illustrated as one block 502, the fifth and sixth inverters and the fifth and sixth motors are illustrated as one block 503, and the seventh and eighth inverters and seventh and eighth motors are illustrated as one block 504.

A battery pack diagnosis apparatus 301 is connected to a battery pack 401, a battery pack diagnosis apparatus 302 is provided between battery packs 403, and a battery pack diagnosis apparatus 303 is connected to a battery pack 404. The battery pack diagnosis apparatuses 301, 302, and 303 may measure integrated insulation resistance ISO_RP and ISO_RN of all or each DC link terminal (inverter terminal). In this case, the battery pack diagnosis apparatuses 301, 302, and 303 may be implemented as a power relay assembly (PRA) # and include battery pack diagnosis circuits 101, 102, 103, and 104 and relay circuits 201, 202, 203, and 204 therein, and may connect at least one of the battery pack diagnosis circuits 101, 102, 103, and 104 to a DC link terminal, to collectively or individually measure insulation resistance of the battery and the DC link terminal in real time.

That is, the battery pack diagnosis circuits 101, 102, 103, and 104 may measure the integrated insulation resistance during charging or discharging (flight) or during charging or discharging standby, and after all relays of the relay circuits 201, 202, 203, and 204 that complete the start are closed (closed state), may measure the integrated insulation resistance to determine whether the entire battery pack has failed, and after the failure of the entire battery pack is determined, may individually measure the insulation resistance of each of the battery packs 401, 402, 403, and 404 to determine which battery pack among the battery packs 401, 402, 403, and 404 has a failure (failure position).

That is, as on or off of each relay of the relay circuits 201, 202, 203 and 204 is controlled, after separating the battery packs 401, 402, 403, and 404 from the inverter, individual insulation resistance of the battery packs 401, 402, 403, and 404 may be measured by sequentially connecting them to the inverter terminal and measuring the integrated insulation resistance.

Referring to FIG. 2, the battery pack diagnosis system may include the battery packs 401, 402, 403, and 404 that supply power to motors or inverters, and battery pack diagnosis apparatuses 301, 302, and 303 that diagnose failures of the battery packs 401, 402, 403, and 404. The battery packs 401, 402, 403, and 404 are connected in parallel, and each of the battery packs 401, 402, 403, and 404 correspond to the diagnosis circuits 101, 102, 103, and 104 of the battery pack diagnosis apparatuses 301, 302, and 303.

The battery pack diagnosis apparatuses 301, 302, and 303 may include the relay circuits 201, 202, 203, and 204 and the diagnosis circuits 101, 102, 103, and 104 for measuring insulation resistance for failure diagnosis of battery packs 401, 402, 403, and 404.

Although not illustrated in FIG. 2, a flight control device (not illustrated) that performs communication (e.g., CAN communication) with the diagnosis circuits 101, 102, 103, and 104 may be further included, and the flight control device may control starting and driving of a flight means, and may provide a failure diagnosis result of the battery pack to a ground control device (not illustrated) outside the flight means.

The battery pack diagnosis circuits 101, 102, 103, and 104 may control the opening or closing of the relays of the relay circuits 201, 202, 203 and 204 to perform integrated insulation resistance measurement and individual insulation resistance measurement.

In FIG. 2, an example in which only the battery pack diagnosis circuit 102 is connected to an inverter terminal (DC link terminal) is disclosed, but the present disclosure is not limited thereto, and all of the diagnosis circuits 101, 102, 103, and 104 may be implemented to be connected to the DC link terminal. After the diagnosis circuits 101, 102, 103, and 104 are all connected to the DC link terminal, individual insulation resistance may be obtained by measuring the integrated insulation resistance of the inverter stage using at least one of the diagnosis circuits 101, 102, 103, and 104 while controlling the opening and closing of the relays of the relay circuits 201, 202, 203, and 204.

FIG. 2 shows an example of measuring individual insulation resistance as well as integrated insulation resistance using the battery pack diagnosis circuit 102, but the overall insulation resistance measurement as well as the individual insulation resistance may be measured using one or each of the battery pack diagnosis circuits 101, 102, 103, and 104.

That is, FIG. 2 shows an example of measuring individual insulation resistance as well as integrated insulation resistance using the battery pack diagnosis circuit 102, but the overall insulation resistance measurement as well as the individual insulation resistance may be measured using one or each of the battery pack diagnosis circuits 101, 102, 103, and 104.

Figure 4:
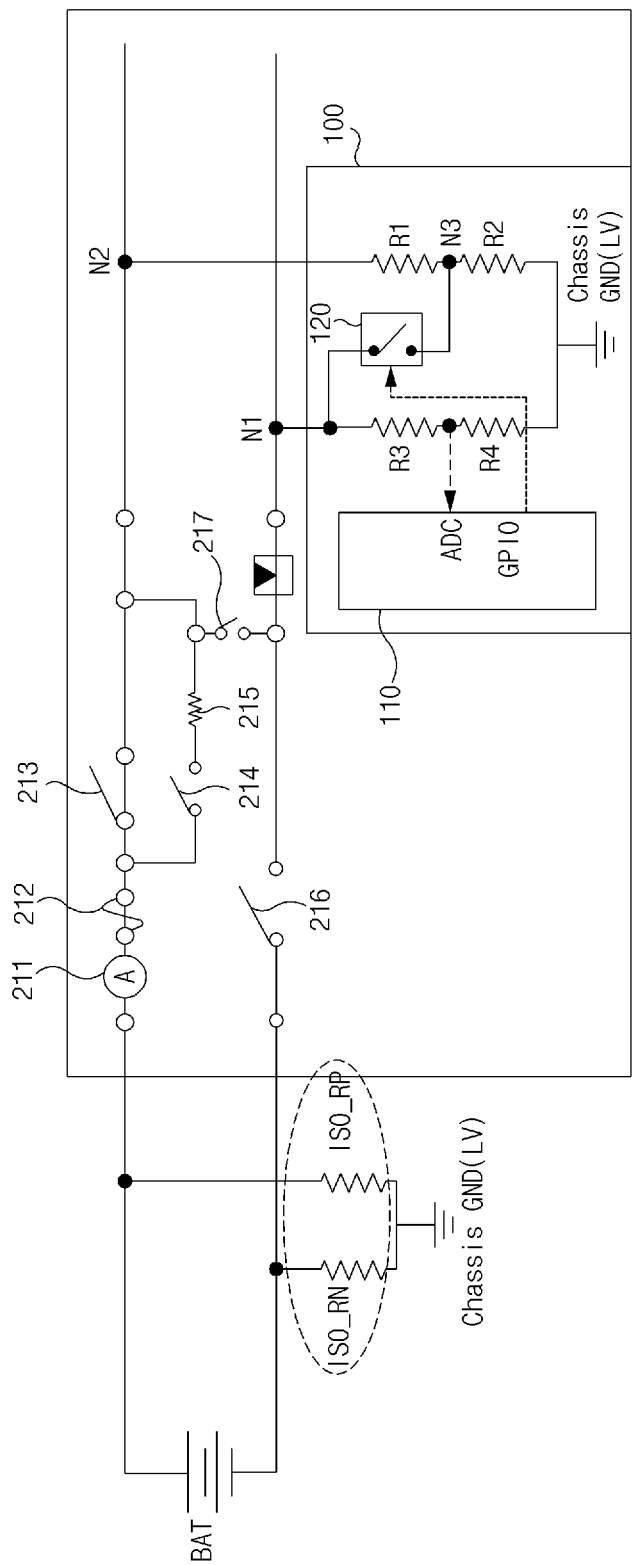
FIG. 4 shows an example battery pack diagnosis apparatus.

FIG. 3 shows an example battery pack diagnosis apparatus, and FIG. 4 shows an example battery pack diagnosis apparatus.

FIG. 3 illustrates a detailed configuration of the battery pack diagnosis apparatus 300. In this case, the battery pack diagnosis apparatus 300 of FIG. 3 may have a same detailed configuration as that of the battery pack diagnosis apparatuses 301, 302, and 303 of FIG. 2.

Referring to FIG. 3, the battery pack diagnosis apparatus 300 may include a battery pack diagnosis circuit 100 and a relay circuit 200.

The battery pack diagnosis circuit 100 includes a battery pack diagnosis controller 110, resistors R1, R2, R3, and R4, and a switch 120. The resistors R1 and R2 are connected in series between a node N2 connected to a relay device 210, that is, a positive (+) voltage terminal, and the chassis ground terminal, and the resistors R3 and R4 are connected in series between a node N1 connected to a relay device 220, that is, a negative (−) voltage terminal, and a chassis ground terminal. The on and off of the switch 120 is controlled by the battery pack diagnosis controller 110, and is connected between the node N1 and a node N3 between the resistors R1 and R2. In this case, the battery insulation resistance ISO_RN and ISO_RP represent parasitic impedance between a battery pack electrode and a chassis ground terminal LV as equivalent resistance.

Referring to FIG. 4, the relay device 210 may include a current sensor 211, a fuse 212, a main relay 213, a precharge relay 214, a resistor 215, and a switch 217.

The relay device 220 may include a main relay 216.

The main relays 213 and 216 are switching devices, and the precharge relay 305 determines whether or not to send a current to an outside of the battery pack diagnosis apparatus 300. The precharge relay 305 may be first closed at a moment when discharging of the motor starts, so that precharging is performed by synchronizing a battery pack voltage and a DC link voltage.

Opposite ends of the battery pack diagnosis apparatus 301 may be connected to the battery pack 401, and the main relays 213 and 216 may be opened or closed under control of the battery pack diagnosis controller 110. A first side of the current sensor 211 may be connected to a first side of the first battery pack 401, and a second side of the current sensor 211 may be connected to a first side of the fuse 212. The main relay 213 and the precharge relay 214 may be connected in parallel, and the precharge resistor 215 may be connected in series with the precharge relay 214. A first side of the main relay 213 is connected to a second side of the fuse 212 and connected to the node N2. A first side of the main relay 216 is connected to the battery pack 401 and a second side thereof is connected to the node N1. The switch 217 is connected between a second side of the resistor 215 and the node N1.

Accordingly, after the main relays 213 and 216 and the precharge relay 214 are closed, a current caused by the battery pack 401 may flow. A current flowing from a + terminal of the battery pack may flow through the current sensor 211 and the fuse 212, and may flow in a direction of the main relay 213 and a direction of the main relay 216. In this case, after the main relay 213 is opened, no current may flow. In addition or alternative, after one of the parallel connected main relay 216 or precharge relay 214 is opened, no current may flow.

Figure 5:
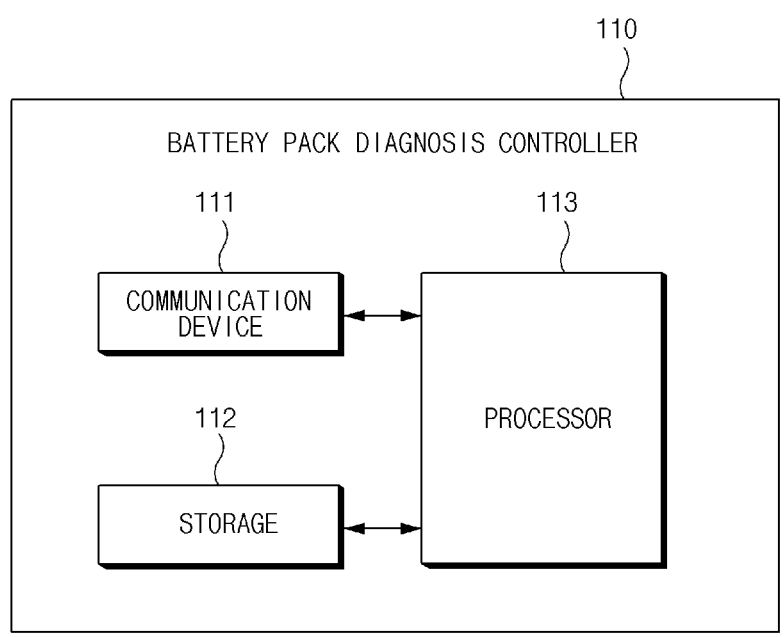
FIG. 5 shows an example battery pack diagnosis controller.

FIG. 5 shows an example battery pack diagnosis controller.

Referring to FIG. 5, the battery pack diagnosis controller 141 may include a communication device 111, a storage 112, and a processor 113. In this case, all of the diagnosis circuits 101, 102, 103, and 104 of FIG. 2 may include the battery pack diagnosis controller 110 illustrated in FIG. 5.

The communication device 111 is a hardware device implemented with various electronic circuits to transmit and receive signals through a wired connection, and may transmit and receive information based on in-vehicle devices and in-vehicle network communication techniques. As an example, the in-vehicle network communication techniques may include controller area network (CAN) communication, local interconnect network (LIN) communication, flex-ray communication, and the like.

As an example, the communication device 111 may transmit a battery pack diagnosis result determined by the processor 113 to another device inside the flight means such as a flight control device (not illustrated).

The storage 112 may store data and/or algorithms used for the processor 113 to operate, and the like. As an example, the storage 112 may pre-store an insulation resistance diagnosis threshold for diagnosing a battery pack failure. In this case, the insulation resistance diagnosis threshold may be previously determined by an experimental value to be stored.

The storage 112 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The processor 113 may be electrically connected to the communication device 111, the storage 112, and the like, may electrically control each component, and may be an electrical circuit that executes software commands, thereby performing various data processing and calculations described below.

The processor 113 may perform overall control such that each component may normally perform their functions by processing a signal transferred between each component of the first battery pack diagnosis controller 110. The processor 113 may be implemented in the form of hardware, software, or a combination of hardware and software. For example, the processor 113 may be implemented as a microprocessor, but the present disclosure is not limited thereto.

The processor 113 may determine whether relays of a first battery pack diagnosis apparatus 301, a second battery pack diagnosis apparatus 302, a third battery pack diagnosis apparatus 303, and a fourth battery pack diagnosis apparatus 304 are all closed, and after they are all closed, may measure the integrated insulation resistance ISO_RP and ISO_RN of the inverter terminals N1 and N2.

The processor 113 may compare measured values of the integrated insulation resistance ISO_RP and ISO_RN with a predetermined insulation resistance diagnosis threshold, in response to comparing that the measured value of the integrated insulation resistance is greater than the predetermined insulation resistance diagnosis threshold, may determine that states of the first battery pack 401, the second battery pack 402, the third battery pack 403, and the fourth battery pack 404 are all normal, and in response to determining that the measured value of the integrated insulation resistance is equal to or smaller than the predetermined insulation resistance diagnosis threshold, and may determine that at least one of the first battery pack 401, the second battery pack 402, the third battery pack 403, and the fourth battery pack 404 is in a failure state.

The processor 113 may output a battery failure state alarm after it is determined that at least one of the first battery pack 401, the second battery pack 402, the third battery pack 403, and the fourth battery pack 404 is in a failure state. In this case, the battery failure state alarm may be transmitted to other controllers in the flight means, such as a flight control device (not illustrated).

Subsequently, the processor 113 may sequentially measure insulation resistance of the first battery pack 401, the second battery pack 402, the third battery pack 403, and the fourth battery pack 404.

Upon determining that at least one of the first battery pack 401, the second battery pack 402, the third battery pack 403, or the fourth battery pack 404 is in a failure state, the processor 113 may control the relays of the first battery pack diagnosis apparatus 301, the second battery pack diagnosis apparatus 302, the third battery pack diagnosis apparatus 303, and the fourth battery pack diagnosis apparatus 304 to measure insulation resistance of each of the first battery pack 401, the second battery pack 402, the third battery pack 403, and the fourth battery pack 404 by individually controlling connection of the first battery pack 401, the second battery pack 402, the third battery pack 403, and the fourth battery pack 404 with the inverter terminal.

Upon determining that at least one of the first battery pack 401, the second battery pack 402, the third battery pack 403, or the fourth battery pack 404 is in an open state or that a battery is determined to be in a failure state as a measurement result of the integrated insulation resistance measured with all relays closed, the processor 113 may determine whether a key off signal is received and relays of the first battery pack diagnosis apparatus 301, the second battery pack diagnosis apparatus 302, the third battery pack diagnosis apparatus 303, and the fourth battery pack diagnosis apparatus 304 are all open.

The processor 113 closes the relay of the first battery pack diagnosis apparatus 301 and then measures the integrated insulation resistance of the inverter terminal in response to determining that the key off signal is received and the relays of the first battery pack diagnosis apparatus 301, the second battery pack diagnosis apparatus 302, the third battery pack diagnosis apparatus 303, and the fourth battery pack diagnosis apparatus 304 are all open.

The processor 113 may determine whether the measured value of the integrated insulation resistance measured after closing the relay of the first battery pack diagnosis apparatus 301 is equal to or smaller than a predetermined insulation resistance diagnosis threshold, and in response to determining that the measured value of the integrated insulation resistance measured after closing the relay of the first battery pack diagnosis apparatus 301 is smaller than the predetermined insulation resistance diagnosis threshold, may determine that the first battery pack 401 is in a failure state and request termination of the start of the flight means (aircraft) to a flight control device (not illustrated).

The processor 113 may define a formula including the integrated insulation resistance ISO_RP and ISO_RN in a state in which the switch 120 is open and a formula including the integrated insulation resistance ISO_RP and ISO_RN in a state in which the switch 120 is closed, to calculate a formula including the integrated insulation resistance ISO_RP and ISO_RN by applying them a simultaneous equation. A description of the method for measuring the insulation resistance will be described in detail below with reference to FIG. 6A and FIG. 6B.

Figure 6A:
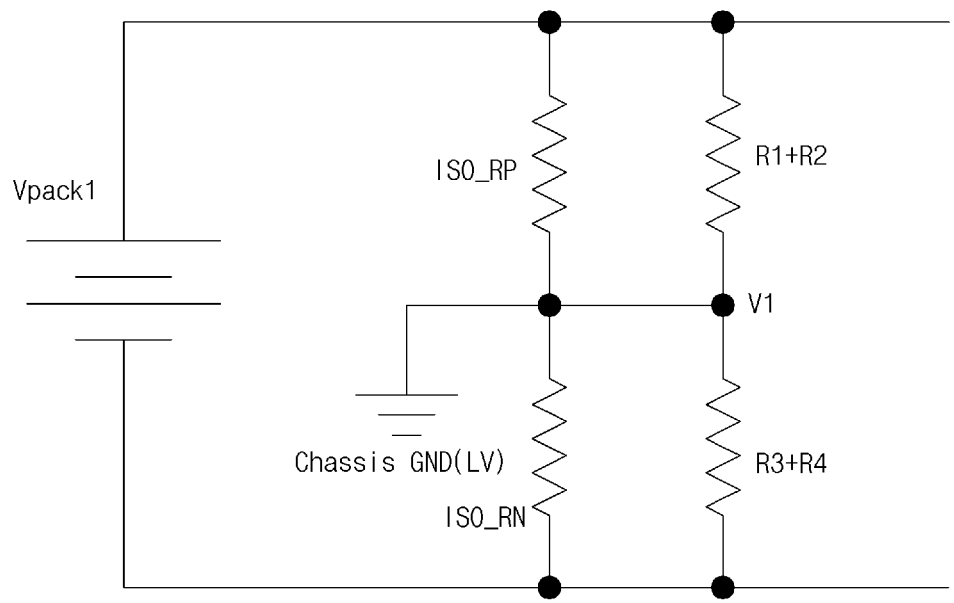
FIG. 6A shows an example equivalent circuit for describing an insulation resistance measuring method during an open state of a switch.
Figure 6B:
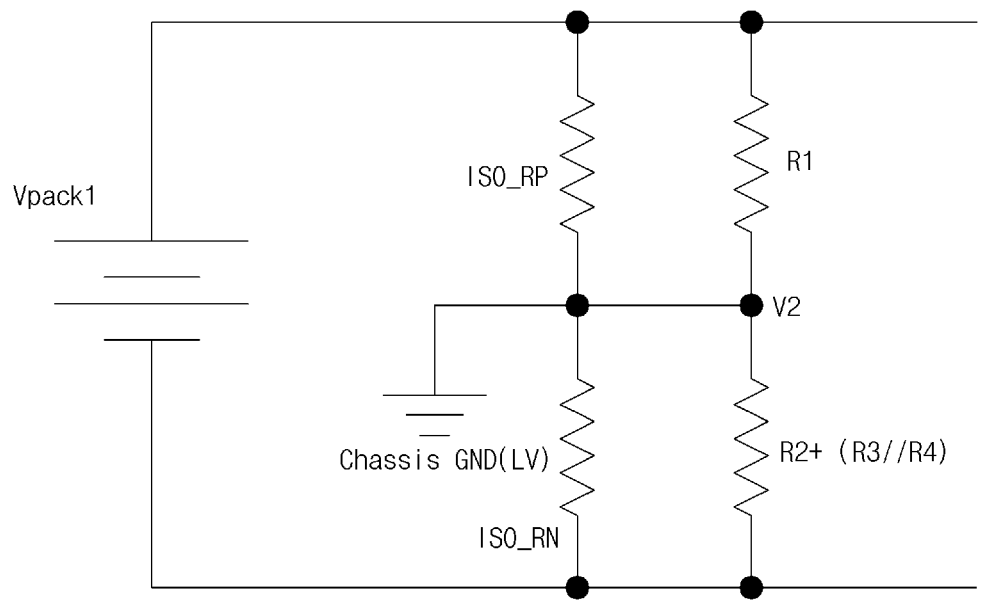
FIG. 6B shows an example equivalent circuit for describing an insulation resistance measuring method during a closed state of a switch.

FIG. 6A shows an example equivalent circuit for describing an insulation resistance measuring method during an open state of a switch, and FIG. 6B shows an example equivalent circuit for describing an insulation resistance measuring method during a closed state of a switch.

The battery pack diagnosis circuit 100 may calculate the insulation resistance ISO_RP and ISO_RN through the simultaneous equation by developing the formula according to an open or closed state of the switch 120. In the equivalent circuit of FIG. 6A, a time for a voltage V1 to be saturated varies depending on a value of Y-capacitance, but the battery pack diagnosis circuit 100 may measure the insulation resistance after the switch 120 operates and waits for a predetermined time (e.g., 5 s) or longer.

If the switch 120 of the battery pack diagnosis circuit 100 is opened, the equivalent circuit is the same as illustrated in FIG. 6A. A voltage Vpack1 of the battery pack is calculated as shown in Equation 1 below.

$$Vpack1 = \frac{ISO\_RP//(R1+R2)}{ISO\_RN//(R3+R4)} \quad \text{(Equation 1)}$$

The battery pack diagnosis circuit 100 may develop Equation 1 as Equation 2 below and Equation 2 as Equation 3 below.

$$Vpack1*(R3+R4) = \frac{ISO\_RP//(R1+R2)}{\frac{ISO\_RN}{ISO\_RN+1}} \quad \text{(Equation 2)}$$

$$ISO\_RN = \frac{ISO\_RP//(R1+R2)}{Vpack1*\left(1 - \frac{ISO\_RP//(R1+R2)}{R3+R4}\right)} \quad \text{(Equation 3)}$$

In addition or alternative, after the switch 120 of the battery pack diagnosis circuit 100 is closed, the equivalent circuit is the same as illustrated in FIG. 6B. The voltage Vpack1 of the battery pack is calculated as shown in Equation 4 below.

$$Vpack1 = \frac{\text{ISO\_RP}//R1}{\text{ISO\_RP}//(R2 + (R3//R4))} \quad \text{(Equation 4)}$$

The battery pack diagnosis circuit 100 may develop Equation 4 as Equation 5 and then develop it as Equation 6.

$$Vpack1 = \frac{\left(\frac{\text{ISO\_RP}*R1}{\text{ISO\_RP}+R1}\right)}{\text{ISO\_RN}//(R2 + (R3//R4))} \quad \text{(Equation 5)}$$

$$\frac{R1}{1 + \frac{R1}{\text{ISO\_RP}}} = \frac{1}{Vpack1*\text{ISO\_RN}//[R2 + (R3//R4)]} \quad \text{(Equation 6)}$$

Thereafter, the battery pack diagnosis circuit 100 may substitute a calculated ISO_RN value into an ISO_RP equation to calculate ISO_RP as shown in Equation 7 below.

$$\text{ISO\_RP} = Vpck1*\text{ISO\_RN}//(R2 + (R3//R4)) - \frac{1}{R1} \quad \text{(Equation 7)}$$

Subsequently, the battery pack diagnosis circuit 100 may calculate IOS_RN after erasing ISO_RP by substituting ISO_RP into an ISO_RN calculation formula of Equation 3.

Figure 7:
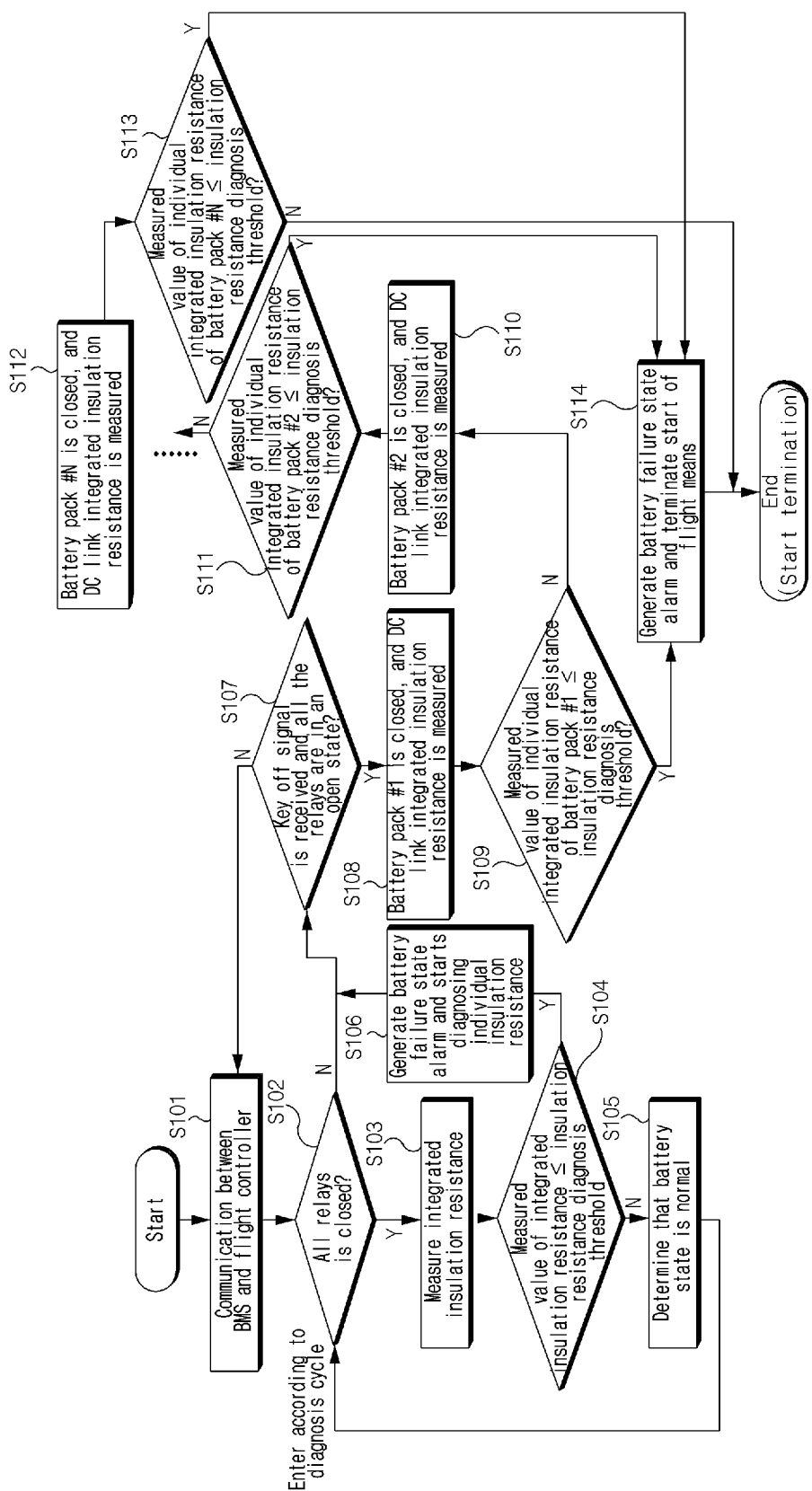
FIG. 7 shows an example flowchart for describing a failure diagnosis method for a high voltage parallel battery pack.

Hereinafter, a battery pack failure diagnosis method according to an example of the present disclosure will be described with reference to FIG. 7. FIG. 7 shows an example flowchart for describing a failure diagnosis method for a high voltage parallel battery pack.

Hereinafter, it is assumed that the battery pack diagnosis circuit 102 of FIG. 2 performs a process of FIG. 7. In addition or alternative, in the description of FIG. 7, it may be understood that operations described as being performed by a device are controlled by a processor 113.

FIG. 2 and FIG. 7 describe an example in which one battery pack diagnosis circuit 102 measures battery pack integrated insulation resistance and individual insulation resistance, but the present disclosure is not limited thereto, and the battery pack integrated insulation resistance and individual insulation resistance may be measured in real time using one of the battery pack diagnosis circuits 101, 103, and 104. In this case, measuring the insulation resistance indicates calculating the insulation resistance value as shown in FIG. 6A and FIG. 6B.

Insulation resistance may not be measured if all relays are open before starting a flight means and after charging and discharging. On the other hand, it is possible to measure the integrated insulation resistance in a state in which all relays are in a closed state while the flight means is in motion, that is, during charging or discharging or charging or discharging standby. In addition or alternative, some of the relays are closed or open during an end of the starting of the flight means (just before the end of the start), and thus insulation resistance of an inverter input terminal (DC link terminal) may be measured in order to measure the insulation resistance of a specific battery pack in which the relay is closed. For example, if the insulation resistance of the inverter input terminal is measured while the relay of the first battery pack is closed, the insulation resistance of the first battery pack may be measured so that the individual insulation resistance may be measured.

Referring to FIG. 7, after communication between a battery management system (BMS) and the flight controller (aircraft controller) starts (S101), the battery pack diagnosis circuit 102 determines whether all relays of the battery pack diagnosis apparatuses 301, 302, and 303 are in a closed state (S102).

If all relays of battery pack diagnosis apparatuses 301, 302, 303 are not closed, the battery pack diagnosis circuit 102 determines whether a key off signal is received and all relays are in an open state to start diagnosing individual insulation resistance (S107).

Meanwhile, after all the relays of the battery pack diagnosis apparatuses 301, 302, and 303 are in a closed state, the battery pack diagnosis circuit 102 measures the integrated insulation resistance of the inverter input terminal (DC link terminal) (S103). That is, the battery pack diagnosis circuit 102 may obtain a measured value of the integrated insulation resistance by measuring the insulation resistance of the inverter input terminal (DC link terminal) in a state in which all the relays of the battery pack diagnosis apparatuses 301, 302, and 303 are closed, that is, the battery packs 401, 402, 403, and 404 are not connected to the inverter input terminal (DC link terminal).

Accordingly, the battery pack diagnosis circuit 102 determines whether the measured value of the integrated insulation resistance is equal to or smaller than a predetermined insulation resistance diagnosis threshold (S104).

In response to determining that the measured value of the integrated insulation resistance is greater than the predetermined insulation resistance diagnosis threshold value, the battery pack diagnosis circuit 102 determines that the battery is in a normal state (S105).

In response to determining that the measured value of the integrated insulation resistance is equal to or smaller than a predetermined insulation resistance diagnosis threshold, the battery pack diagnosis circuit 102 determines that the battery is in a failure state, outputs a battery failure state alarm, and starts diagnosing individual insulation resistance (S106). That is, the battery pack diagnosis circuit 102 may start diagnosing individual insulation resistance after all the relays of the battery pack diagnosis apparatuses 301, 302, and 303 are not closed or the battery is determined to be in a failure state based on the integrated insulation resistance measurement.

That is, in response to determining that all the relays of the battery pack diagnosis apparatuses 301, 302, and 303 are not in a closed state, or the battery is determined to be in a failure state based on the measured value of integrated insulation resistance, the battery pack diagnosis circuit 102 determines whether a key off signal is received and all the relays are in an open state to start diagnosing individual insulation resistance (S107).

In response to determining that the key off signal is received and all the relays are not open, the process returns to step (S101). On the other hand, after the key off signal is received and all the relays are in an open state, the relay connected to a battery pack #1 is closed, and the DC link integrated insulation resistance is measured (S108).

In FIG. 2, after the relay of the battery pack diagnosis apparatus 301 connected to the battery pack 401 is converted to a closed state and the relays of the battery pack diagnosis apparatuses 302, 303, and 304 connected to the remaining battery packs 402, 403, and 404 are in an open state, the battery pack 401 is connected to the DC link, and thus the combined insulation resistance ISO_RP and ISO_RN of the DC link have a same value as insulation resistance of the battery pack 401. Accordingly, a value obtained by measuring the integrated insulation resistance ISO_RP and ISO_RN of the DC link becomes a value obtained by measuring the individual insulation resistance of the battery pack 401.

The battery pack diagnosis circuit 102 determines whether a measured value of the individual integrated insulation resistance of the battery pack #1 is equal to or smaller than a predetermined insulation resistance diagnosis threshold (S109).

The battery pack diagnosis circuit 102 may determine that the battery pack #1 is in a failure state in response to determining that the measured value of the individual integrated insulation resistance of the battery pack #1 is equal to or smaller than the predetermined insulation resistance diagnosis threshold, and may generate a battery failure state alarm and request a flight control device (not illustrated) to terminate the start of the flight means (S114).

On the other hand, in response to comparing that the measured value of the individual integrated insulation resistance of the battery pack #1 is greater than the predetermined insulation resistance diagnosis threshold, the battery pack diagnosis circuit 102 determines that the battery pack #1 is in a normal state, and closes the relay connected to a battery pack #2 to measure the individual insulation resistance of the battery pack #2 and measures the DC link integrated insulation resistance (S110). In this case, the relay connected to the battery pack #2 is closed, and the relays of the battery pack #1, battery pack #3 to #N are opened.

Next, the battery pack diagnosis circuit 102 determines whether a measured value of the individual integrated insulation resistance of the battery pack #2 is equal to or smaller than a predetermined insulation resistance diagnosis threshold (S111).

The battery pack diagnosis circuit 102 may determine that the battery pack #2 is in a failure state in response to comparing that the measured value of the individual integrated insulation resistance of the battery pack #2 is equal to or smaller than the predetermined insulation resistance diagnosis threshold, and may generate a battery failure state alarm and request a flight control device (not illustrated) to terminate the start of the flight means (S114).

On the other hand, in response to comparing that the measured value of the individual integrated insulation resistance of the battery pack #2 is greater than the predetermined insulation resistance diagnosis threshold, the battery pack diagnosis circuit 102 may determine that battery pack #2 is in a normal state, and may close the relay connected to the battery pack #3 and measure the DC link integrated insulation resistance for the individual insulation resistance measurement of the battery pack #3.

Hereinafter, the battery pack diagnosis circuit 102 measures the individual insulation resistance of the battery packs #3, #4, . . . , and #N by repeating the above process (S112), compares a measured value of the individual integrated insulation resistance of the battery pack #N to the predetermined insulation resistance diagnosis threshold, and in response to comparing that the measured value of the individual integrated insulation resistance of the battery pack #N is greater than the predetermined insulation resistance diagnosis threshold, determines that all the battery packs #1, #2, . . . and #N are in a normal state and ends the start.

On the other hand, if the measured value of the individual integrated insulation resistance of the battery pack #N is smaller than the predetermined insulation resistance diagnosis threshold, it determines that the battery pack #N is in a failure state to generate a battery failure state alarm, and requests termination of flight means start (S114).

As such, according to the present disclosure, during start control of the flight means, it is determined whether an insulation resistance failure has occurred by measuring the integrated insulation resistance of the DC link terminal, and the individual insulation resistance of the battery pack is measured to determine the exact failure portion. That is, according to the present disclosure, in response to checking that the failure of the integrated insulation resistance, an exact position of the battery pack where the insulation resistance failure occurred is known by measuring insulation resistance of individual batteries while sequentially disconnecting the batteries parallel-connected during start termination.

In addition or alternative, according to the present disclosure, it is possible to prevent an inaccurately measured value of insulation resistance due to resistance interference between existing battery pack insulation resistance measurement circuits by providing a diagnosis circuit at a rear end of a relay circuit.

Figure 8:
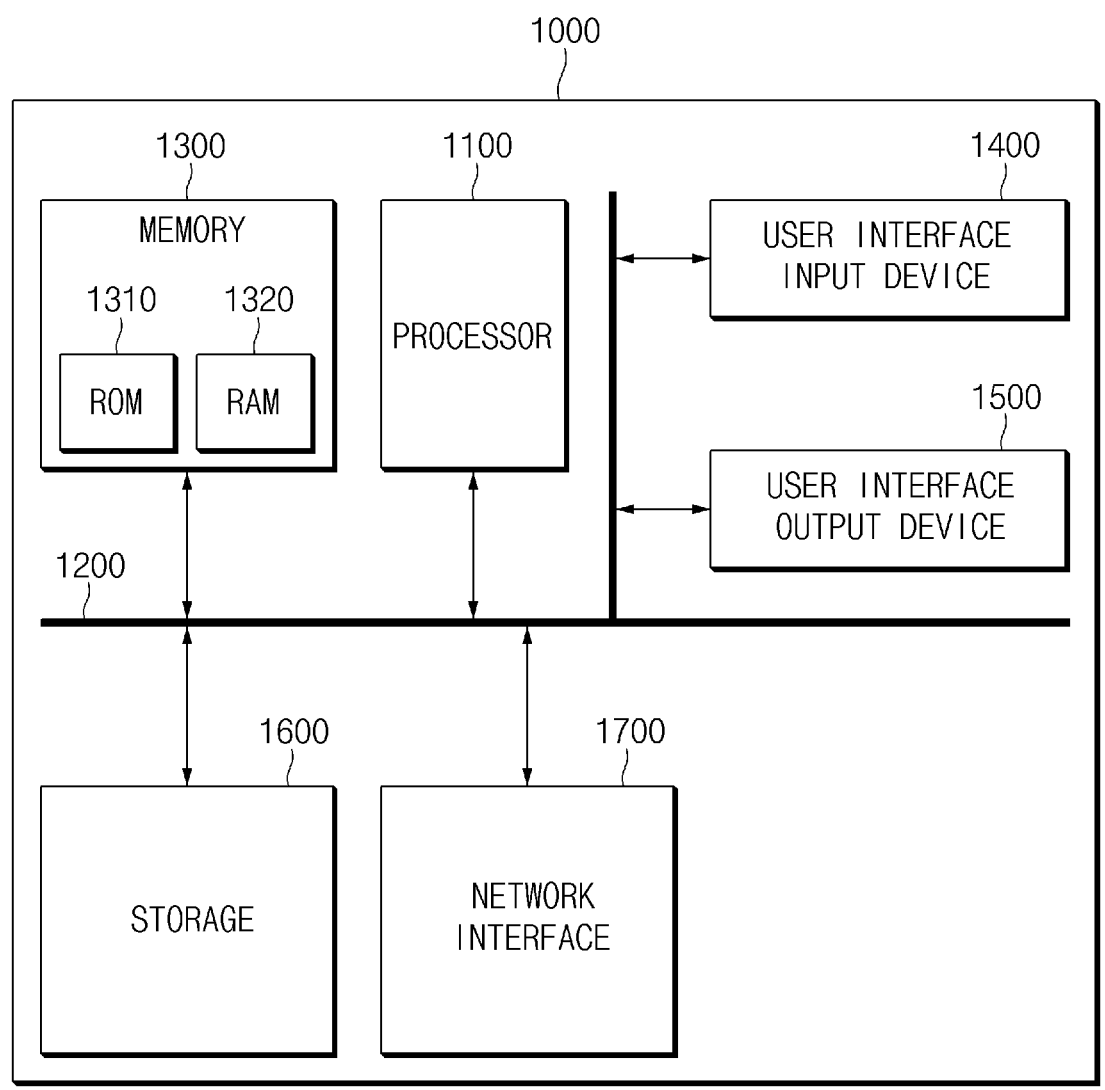
FIG. 8 shows an example computing system.

FIG. 8 shows an example computing system.

Referring to FIG. 8, the computing system 1000 includes at least one processor 1100 connected through a bus 1200, a memory 1300, a user interface input device 1400, a user interface output device 1500, and a storage 1600, and a network interface 1700.

The at least one processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320.

An example of the present disclosure has been made in an effort to provide a battery pack diagnosis system and a method thereof, capable of accurately diagnosing a battery failure and failure position by accurately measuring insulation resistance between a parallel battery pack mounted on a flight means and a chassis ground.

An example of the present disclosure has been made in an effort to provide a battery pack diagnosis system and a method thereof, capable of preventing an inaccurately measured value of insulation resistance due to resistance interference between existing battery pack insulation resistance measurement circuits by providing a diagnosis circuit at a rear end of a relay circuit.

The technical objects of the present disclosure are not limited to the objects mentioned above, and other technical objects not mentioned may be clearly understood by those skilled in the art from the description of the claims.

An example of the present disclosure provides a battery pack diagnosis system including: a first battery pack diagnosis apparatus connected to a first battery pack; a second battery pack diagnosis apparatus connected to a second battery pack; a third battery pack diagnosis apparatus connected to a third battery pack; and a fourth battery pack diagnosis apparatus connected to a fourth battery pack, wherein the first battery pack diagnosis apparatus is configured to determine whether a battery is in a failure state by measuring integrated insulation resistance of an inverter terminal of a flight means, and to determine a position where the battery is in the failure state by individually measuring insulation resistance of the first battery pack, the second battery pack, the third battery pack, and the fourth battery pack in response to determining that the battery is in the failure state.

In an example of the present disclosure, the first battery pack diagnosis apparatus to the fourth battery pack diagnosis apparatus may each be configured to include a relay circuit configured to control a voltage of the first battery pack to be applied to the inverter terminal; and a diagnosis circuit connected to an output terminal of the relay circuit to measure integrated insulation resistance of the inverter terminal.

In an example of the present disclosure, the diagnosis circuit may be configured to include a resistance portion configured to include a plurality of resistors connected in parallel between the inverter terminal and a chassis ground terminal; a switch portion provided between the inverter terminal and the resistance portion; and a battery pack diagnosis controller configured to measure the integrated insulation resistance by controlling on or off of the switch portion.

In an example of the present disclosure, the battery pack diagnosis controller is configured to determine whether relays of the first battery pack diagnosis apparatus, the second battery pack diagnosis apparatus, the third battery pack diagnosis apparatus, and the fourth battery pack diagnosis apparatus are all closed.

In an example of the present disclosure, the battery pack diagnosis controller may be configured, in response to determining that relays of the first battery pack diagnosis apparatus, the second battery pack diagnosis apparatus, the third battery pack diagnosis apparatus, and the fourth battery pack diagnosis apparatus are all closed, to measure the integrated insulation resistance.

In an example of the present disclosure, the battery pack diagnosis controller may be configured to define Equation 1 including the integrated insulation resistance in an open state of the switch portion, to define Equation 2 including the integrated insulation resistance in a closed state of the switch portion, and to calculate the integrated insulation resistance using Equation 1 and Equation 2.

In an example of the present disclosure, the battery pack diagnosis controller may be configured to compare a measured value of the integrated insulation resistance with a predetermined insulation resistance diagnosis threshold.

In an example of the present disclosure, the battery pack diagnosis controller may be configured to determine that states of the first battery pack, the second battery pack, the third battery pack, and the fourth battery pack are all normal in response to comparing that the measured value of the integrated insulation resistance is greater than the predetermined insulation resistance diagnosis threshold.

In an example of the present disclosure, the battery pack diagnosis controller may be configured to determine that at least one of the first battery pack, the second battery pack, the third battery pack, and the fourth battery pack is in a failure state in response to comparing that the measured value of the integrated insulation resistance is smaller than or equal to the predetermined insulation resistance diagnosis threshold.

In an example of the present disclosure, the battery pack diagnosis controller may be configured, in response to determining that at least one of the first battery pack, the second battery pack, the third battery pack, and the fourth battery pack is in a failure state, to output a battery failure state alarm, and to sequentially measure insulation resistance of the first battery pack, the second battery pack, the third battery pack, and the fourth battery pack.

In an example of the present disclosure, the battery pack diagnosis controller may be configured, in response to determining that at least one of the first battery pack, the second battery pack, the third battery pack, and the fourth battery pack is in a failure state, to control relays of the first battery pack diagnosis apparatus, the second battery pack diagnosis apparatus, the third battery pack diagnosis apparatus, and the fourth battery pack diagnosis apparatus, to individually control connection of the first battery pack, the second battery pack, the third battery pack, and the fourth battery pack to the inverter terminal, and to measure insulation resistance of each of the first battery pack, the second battery pack, the third battery pack, and the fourth battery pack.

In an example of the present disclosure, the battery pack diagnosis controller may be configured, in response to determining that at least one of the relays of the first battery pack diagnosis apparatus, the second battery pack diagnosis apparatus, the third battery pack diagnosis apparatus, and the fourth battery pack diagnosis apparatus is open, or in response to determining that a battery is in a failure state as a result of measuring the integrated insulation resistance, to determine whether a key off signal is received and the relays of the first battery pack diagnosis apparatus, the second battery pack diagnosis apparatus, the third battery pack diagnosis apparatus, and the fourth battery pack diagnosis apparatus are all open.

In an example of the present disclosure, the battery pack diagnosis controller may be configured, in response to determining that the key off signal is received and the relays of the first battery pack diagnosis apparatus, the second battery pack diagnosis apparatus, the third battery pack diagnosis apparatus, and the fourth battery pack diagnosis apparatus are all open, after closing the relay of the first battery pack diagnosis apparatus, to measure integrated insulation resistance of the inverter terminal.

In an example of the present disclosure, the battery pack diagnosis controller may be configured to determine whether a measured value of the measured integrated insulation resistance is smaller than or equal to a predetermined insulation resistance diagnosis threshold after closing the relay of the first battery pack diagnosis apparatus, to determine that the first battery pack is in a failure state in response to determining that the measured value of the measured integrated insulation resistance is smaller than or equal to the predetermined insulation resistance diagnosis threshold after closing the relay of the first battery pack diagnosis apparatus, and to request start termination of a flight means.

In an example of the present disclosure, the battery pack diagnosis controller may be configured to determine that the first battery pack is in a normal state in response to determining that the measured value of the measured integrated insulation resistance is greater than the predetermined insulation resistance diagnosis threshold after closing the relay of the first battery pack diagnosis apparatus, and after opening the relay of the first battery pack diagnosis apparatus and closing the relay of the second battery pack diagnosis apparatus, to determine whether the second battery pack is in a failure state by measuring the integrated insulation resistance of the inverter terminal.

In an example of the present disclosure, the resistance portion may be configured to include a first resistor and a second resistor connected in series between a positive (+) voltage terminal of the inverter terminal and a chassis ground terminal; and a third resistor and a fourth resistor connected in series between a negative (−) voltage terminal of the inverter terminal and the chassis ground terminal, and a first side of the switch portion is connected to the negative (−) voltage terminal of the inverter terminal, and a second side of the switch portion is connected to a node between the first resistor and the second resistor.

In an example of the present disclosure, the relay circuit may be configured to include a first relay portion connected to a plus (+) terminal of the first battery pack; and a second relay portion connected to a minus (−) terminal of the first battery pack.

In an example of the present disclosure, at least one of a diagnosis circuit of the first battery pack diagnosis apparatus, a diagnosis circuit of the second battery pack diagnosis apparatus, a diagnosis circuit of the third battery pack diagnosis apparatus, and a diagnosis circuit of the fourth battery pack diagnosis apparatus may be connected to the inverter terminal to measure the integrated insulation resistance.

An example of the present disclosure provides a battery pack diagnosis method of a battery pack diagnosis system including a first battery pack diagnosis apparatus connected to a first battery pack; a second battery pack diagnosis apparatus connected to a second battery pack; a third battery pack diagnosis apparatus connected to a third battery pack; and a fourth battery pack diagnosis apparatus connected to a fourth battery pack, the method including: determining whether a battery is in a failure state by measuring integrated insulation resistance of an inverter terminal of a flight means; and determining a failure position by individually measuring insulation resistance of the first battery pack, the second battery pack, the third battery pack, and the fourth battery pack in response to determining that a failure occurs in the battery.

In an example of the present disclosure, the determining of the failure position by individually measuring the insulation resistance may include, in response to determining that at least one of the relays of the first battery pack diagnosis apparatus, the second battery pack diagnosis apparatus, the third battery pack diagnosis apparatus, and the fourth battery pack diagnosis apparatus is open, or in response to determining that the battery is in a failure state based on the measured value of the integrated insulation resistance measured in a closed state of all the relays of the first battery pack diagnosis apparatus, the second battery pack diagnosis apparatus, the third battery pack diagnosis apparatus, and the fourth battery pack diagnosis apparatus, after determining whether a key off signal is received and the relays of the first battery pack diagnosis apparatus, the second battery pack diagnosis apparatus, the third battery pack diagnosis apparatus, and the fourth battery pack diagnosis apparatus are all open, individually measuring insulation resistance of the first battery pack, the second battery pack, the third battery pack, and the fourth battery pack.

According to the present technique, it is possible to accurately diagnose a battery failure and failure position by accurately measuring insulation resistance between a parallel battery pack mounted on a flight and a chassis ground.

In addition or alternative, according to the present technique, it is possible to prevent an inaccurately measured value of insulation resistance due to resistance interference between existing battery pack insulation resistance measurement circuits by providing a diagnosis circuit at a rear end of a relay circuit.

Furthermore, various effects that can be directly or indirectly identified through this document may be provided.

Accordingly, steps of a method or algorithm described in connection with the examples disclosed herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, an EEPROM memory, a register, a hard disk, a removable disk, and a CD-ROM.

An storage medium is coupled to the processor 1100, which may read information from and write information to the storage medium. Alternatively or additionally, the storage medium may be integrated with the processor 1100. The processor and the storage medium may reside within an application specific integrated circuit (ASIC). The ASIC may reside within a user terminal. Alternatively or additionally, the processor and the storage medium may reside as separate components within the user terminal.

The above description is merely illustrative of the technical idea of the present disclosure, and those skilled in the art to which the present disclosure pertains may make various modifications and variations without departing from the essential characteristics of the present disclosure.

Therefore, the examples disclosed in the present disclosure are not intended to limit the technical ideas of the present disclosure, but to explain them, and the scope of the technical ideas of the present disclosure is not limited by these examples. The protection range of the present disclosure should be interpreted by the claims below, and all technical ideas within the equivalent range should be interpreted as being included in the scope of the present disclosure.

What is claimed is:

1. A system for a vehicle, the system comprising:
a first battery pack diagnosis apparatus connected to a first battery pack;
a second battery pack diagnosis apparatus connected to a second battery pack;
a third battery pack diagnosis apparatus connected to a third battery pack; and
a fourth battery pack diagnosis apparatus connected to a fourth battery pack,
wherein the first battery pack diagnosis apparatus is configured to:
determine, based on a measured value of an integrated insulation resistance of an inverter terminal associated with the vehicle, whether a battery, of the first battery pack, the second battery pack, the third battery pack, or the fourth battery pack, is in a failure state;
based on a determination that the battery is in the failure state and based on individually measured insulation resistance of the first battery pack, the second battery pack, the third battery pack, and the fourth battery pack, determine a failure position of the battery; and
output a signal indicating at least one of the failure state or the failure position.

2. The system of claim 1, wherein each of the first, second, third, and fourth battery pack diagnosis apparatuses is configured to include:
a relay circuit configured to control a voltage, of a battery pack, to be applied to the inverter terminal; and
a diagnosis circuit connected to an output terminal of the relay circuit to measure the integrated insulation resistance of the inverter terminal.

3. The system of claim 2, wherein the diagnosis circuit is configured to include:
a resistance portion configured to include a plurality of resistors connected in parallel between the inverter terminal and a chassis ground terminal;
a switch portion provided between the inverter terminal and the resistance portion; and a battery pack diagnosis controller configured to measure the integrated insulation resistance by controlling an on or off state of the switch portion.

4. The system of claim 3, wherein the battery pack diagnosis controller is configured to determine whether a relay of the first battery pack diagnosis apparatus, a relay of the second battery pack diagnosis apparatus, a relay of the third battery pack diagnosis apparatus, and a relay of the fourth battery pack diagnosis apparatus are closed.

5. The system of claim 4, wherein the battery pack diagnosis controller is configured to measure the integrated insulation resistance, while the vehicle is in motion, based on a determination that the relays of the first battery pack diagnosis apparatus, the second battery pack diagnosis apparatus, the third battery pack diagnosis apparatus, and the fourth battery pack diagnosis apparatus are closed, and
wherein the first battery pack diagnosis apparatus is configured to transmit, to an external device, the signal indicating at least one of the failure state or the failure position.

6. The system of claim 5, wherein the first battery pack is coupled to the inverter terminal via the first battery pack diagnosis apparatus, and
wherein the battery pack diagnosis controller is configured to determine the integrated insulation resistance based on:
a first pair of resistors, connected in series, connected to one of the relays; and
a second pair of resistors, connected in series, connected to another of the relays.

7. The system of claim 4, wherein the battery pack diagnosis controller is configured to determine whether the measured value of the integrated insulation resistance satisfies a predetermined insulation resistance diagnosis threshold.

8. The system of claim 7, wherein the battery pack diagnosis controller is configured to determine that each state of the first battery pack, the second battery pack, the third battery pack, and the fourth battery pack is a normal state based on a determination that the measured value of the integrated insulation resistance satisfies the predetermined insulation resistance diagnosis threshold.

9. The system of claim 7, wherein the battery pack diagnosis controller is configured to determine that at least one of the first battery pack, the second battery pack, the third battery pack, or the fourth battery pack is in a failure state based on a determination that the measured value of the integrated insulation resistance does not satisfy the predetermined insulation resistance diagnosis threshold.

10. The system of claim 9, wherein the battery pack diagnosis controller is configured to, based on a determination that the at least one of the first battery pack, the second battery pack, the third battery pack, or the fourth battery pack is in the failure state:
output a battery failure state alarm; and
sequentially measure insulation resistance of the first battery pack, the second battery pack, the third battery pack, and the fourth battery pack.

11. The system of claim 9, wherein the battery pack diagnosis controller is configured to, based on a determination that the at least one of the first battery pack, the second battery pack, the third battery pack, or the fourth battery pack is in the failure state:
control relays of the first battery pack diagnosis apparatus, the second battery pack diagnosis apparatus, the third battery pack diagnosis apparatus, and the fourth battery pack diagnosis apparatus;
individually control connection of the first battery pack, the second battery pack, the third battery pack, and the fourth battery pack to the inverter terminal; and
measure insulation resistance of each of the first battery pack, the second battery pack, the third battery pack, and the fourth battery pack.

12. The system of claim 5, wherein the battery pack diagnosis controller is configured, based on a determination that at least one of the relays of the first battery pack diagnosis apparatus, the second battery pack diagnosis apparatus, the third battery pack diagnosis apparatus, or the fourth battery pack diagnosis apparatus is open, or
a determination that the battery is in the failure state based on the measured value of the integrated insulation resistance,
to determine whether:
a key off signal is received; and
the relays of the first battery pack diagnosis apparatus, the second battery pack diagnosis apparatus, the third battery pack diagnosis apparatus, and the fourth battery pack diagnosis apparatus are open.

13. The system of claim 12, wherein the battery pack diagnosis controller is configured to, based on a determination that the key off signal is received and the relays of the first battery pack diagnosis apparatus, the second battery pack diagnosis apparatus, the third battery pack diagnosis apparatus, and the fourth battery pack diagnosis apparatus are open:
after closing the relay of the first battery pack diagnosis apparatus, measure the integrated insulation resistance of the inverter terminal.

14. The system of claim 13, wherein the battery pack diagnosis controller is configured to:
determine whether the measured value of the integrated insulation resistance fails to satisfy a predetermined insulation resistance diagnosis threshold after the relay of the first battery pack diagnosis apparatus is closed;
determine that the first battery pack is in the failure state based on a determination that the measured value of the integrated insulation resistance fails to satisfy the predetermined insulation resistance diagnosis threshold after the relay of the first battery pack diagnosis apparatus is closed; and
request start termination of operation of the vehicle.

15. The system of claim 3, wherein the resistance portion is configured to include:
a first resistor and a second resistor connected in series between a positive voltage terminal of the inverter terminal and the chassis ground terminal;
a third resistor and a fourth resistor connected in series between a negative voltage terminal of the inverter terminal and the chassis ground terminal;
a first side of the switch portion connected to the negative voltage terminal of the inverter terminal; and
a second side of the switch portion connected to a node between the first resistor and the second resistor.

16. The system of claim 3, wherein the relay circuit is configured to include:
a first relay portion connected to a plus terminal of the first battery pack; and
a second relay portion connected to a minus terminal of the first battery pack.

17. The system of claim 2, wherein at least one of a diagnosis circuit of the first battery pack diagnosis apparatus, a diagnosis circuit of the second battery pack diagnosis apparatus, a diagnosis circuit of the third battery pack diagnosis apparatus, or a diagnosis circuit of the fourth battery pack diagnosis apparatus is connected to the inverter terminal to measure the integrated insulation resistance.

18. A method for a vehicle comprising:
   determining, by a first battery pack diagnosis apparatus and based on a measured value of an integrated insulation resistance of an inverter terminal associated with the vehicle, whether a battery, of a first battery pack, a second battery pack, a third battery pack, or a fourth battery pack, is in a failure state;
   based on determining that a failure occurs in the battery and based on individually measuring insulation resistance of the first battery pack, the second battery pack, the third battery pack, and the fourth battery pack, determining a failure position of the battery; and
   outputting a signal indicating at least one of the failure state or the failure position, wherein:
   the first battery pack diagnosis apparatus, comprising first circuitry, is connected to the first battery pack;
   a second battery pack diagnosis apparatus, comprising second circuitry, is connected to the second battery pack;
   a third battery pack diagnosis apparatus, comprising third circuitry, is connected to the third battery pack; and
   a fourth battery pack diagnosis apparatus, comprising fourth circuitry, is connected to the fourth battery pack.

19. The method of claim 18, further comprising:
   measuring the integrated insulation resistance based on a determination that relays of the first battery pack diagnosis apparatus, the second battery pack diagnosis apparatus, the third battery pack diagnosis apparatus, and the fourth battery pack diagnosis apparatus are closed, while the vehicle is in motion, wherein;
   the first battery pack diagnosis apparatus comprises a relay circuit configured to control a voltage, of the first battery pack, to be applied to the inverter terminal, and
   the determining of the failure position is based on:
      a determination that at least one of the relays of the first battery pack diagnosis apparatus, the second battery pack diagnosis apparatus, the third battery pack diagnosis apparatus, or the fourth battery pack diagnosis apparatus is open; or
      a determination that the battery is in the failure state based on the measured value of the integrated insulation resistance measured in a closed state of the relays of the first battery pack diagnosis apparatus, the second battery pack diagnosis apparatus, the third battery pack diagnosis apparatus, and the fourth battery pack diagnosis apparatus.

20. A vehicle comprising:
a plurality of battery pack diagnosis apparatuses comprising:
   a first battery pack diagnosis apparatus, comprising first circuitry, connected to a first battery pack of a plurality of battery packs; and
   a second battery pack diagnosis apparatus, comprising second circuitry, connected to a second battery pack of the plurality of battery packs,
wherein the first battery pack diagnosis apparatus is configured to:
   determine, based on a measured value of an integrated insulation resistance of an inverter terminal associated with the vehicle, whether a battery, of the plurality of battery packs, is in a failure state;
   based on a determination that the battery is in the failure state and based on individually measured insulation resistance of each battery pack of the plurality of battery packs, determine a failure position of the battery; and
   output a signal indicating at least one of the failure state or the failure position,
wherein at least one of the plurality of battery pack diagnosis apparatuses comprises a relay configured to control a voltage, of one of the plurality of battery packs, to be applied to the inverter terminal, and
wherein at least one of the plurality of battery pack diagnosis apparatuses is configured to measure the integrated insulation resistance, based on a determination that the relays of the plurality of battery pack diagnosis apparatuses are closed, while the vehicle in motion.

* * * * *